UNITED STATES PATENT OFFICE.

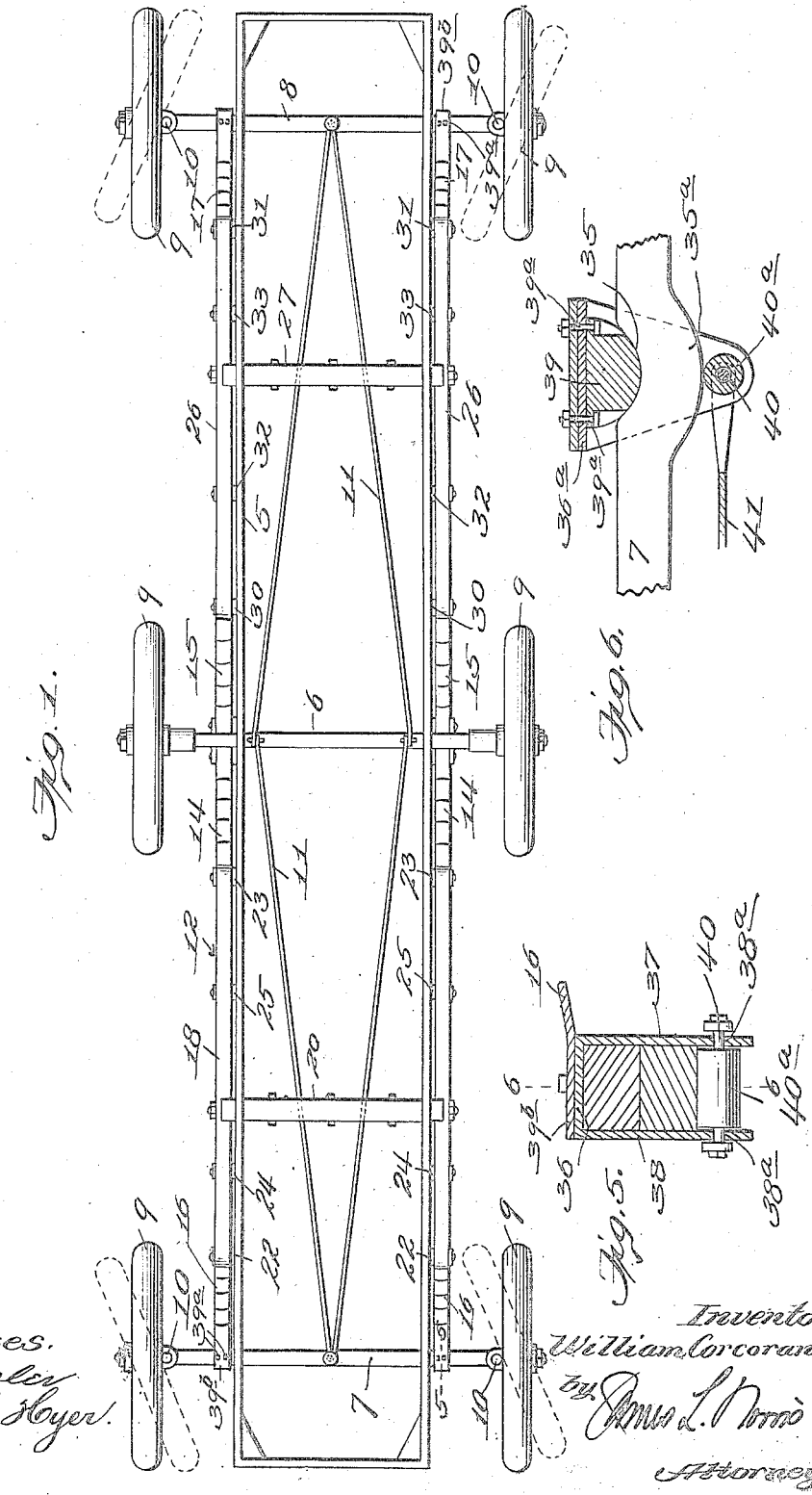

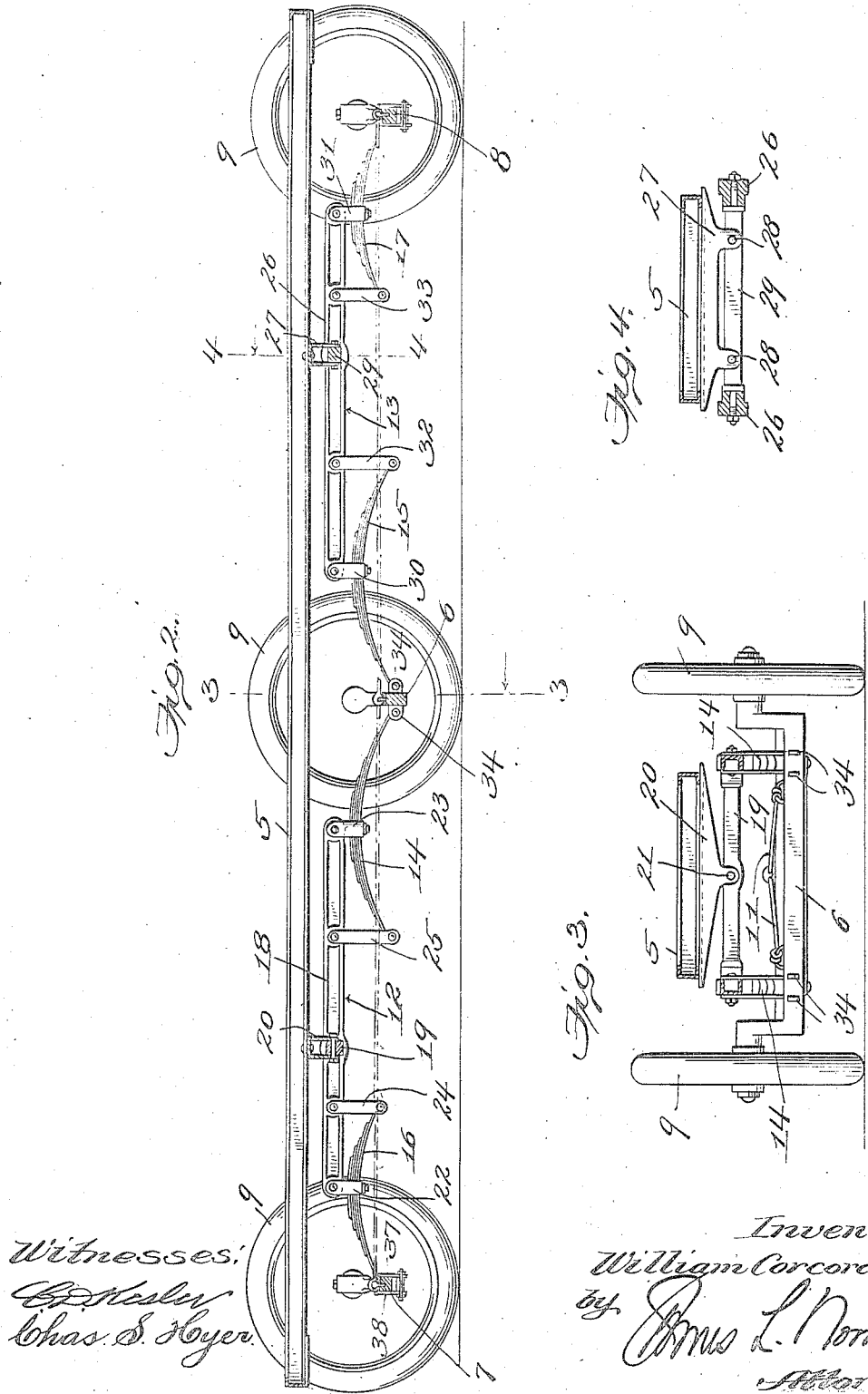

WILLIAM CORCORAN, OF PORTLAND, OREGON.

RUNNING-GEAR FOR VEHICLES.

1,205,858.

Specification of Letters Patent. Patented Nov. 21, 1916.

Application filed August 1, 1916. Serial No. 112,579.

*To all whom it may concern:*

Be it known that I, WILLIAM CORCORAN, a citizen of the United States, residing at Portland, in the county of Multnomah and State of Oregon, have invented new and useful Improvements in Running-Gear for Vehicles, of which the following is a specification.

This invention relates to motor driven and other vehicles of the six-wheel type in which the front and rear sets of wheels are simultaneously operated for steering purposes, and the objects in view are to provide a vehicle of the class specified having easy steering control, means for advantageously distributing the weight on all the wheels and effecting an easy riding movement of the vehicle or car relatively to road obstructions and depressions through the medium of novel front and rear equalizer organizations and by hinging the running gear on the intermediate or central driving axle and at the same time maintain a practical adherence of the wheels of the latter axle relatively to the road surface.

The running gear of the improved vehicle is prevented from having the least sidewise motion, being held rigid to obviate such motion. Each wheel of the improved vehicle is free to drop into a depression or hollow space in a roadway or to pass over an elevation in the roadway without affecting the easy and comfortable riding movement of the vehicle as much as in a four-wheel vehicle, such advantage in favor of the improved vehicle being due to the action of the equalizer organizations disposed in advance and in rear of the central driving axle and wheels and operating to absorb and transmit shocks a greater distance rearwardly. The front portion of the frame of the body of the vehicle or car rests at the center with relation to the front equalizer organization so that a greater variation of control relatively to the rear wheels may be had, and the rear portion of the said frame will rest at two points relatively to the rear equalizer organization and by this arrangement the vehicle or car will be controlled principally by the four wheels in rear of the front pair of wheels. In other words, the load has a three-point bearing or suspension relatively to the running gear.

In the accompanying drawings one practical illustration of the invention is shown, the body of the vehicle as well as the driving mechanism being omitted, it being intended to use any form of driving mechanism as well as steering means, the invention relating more particularly to the running gear having the advantages hereinbefore specified.

In the drawings: Figure 1 is a top plan view of the running gear and frame of the vehicle body embodying the features of the invention. Fig. 2 is a central longitudinal vertical section of the running gear and vehicle body as shown by Fig. 1. Fig. 3 is a transverse vertical section taken in the plane of the line 3—3, Fig. 2. Fig. 4 is a transverse vertical section taken in the plane of the line 4—4, Fig. 2, with the adjacent intermediate wheels and axle omitted. Fig. 5 is a detail cross-section through one of the axles and the spring extremity and taken in the plane of the line 5—5, Fig. 1. Fig. 6 is a section taken in the plane of the line 6—6, Fig. 5, and in a direction parallel with the axle, a part of the latter being shown in elevation.

The numeral 5 designates a body frame or chassis mounted over an intermediate drive axle 6 and front and rear axles 7 and 8, these axles 6, 7 and 8 being equipped with wheels 9 of any approved type. The front and rear pairs of wheels 9 are swiveled, as at 10, so that they may be operated for steering purposes, and as hereinbefore specified suitable steering gear will be connected to these wheels for simultaneously shifting the same so as to effect an advantageous steering operation. The wheels 9 of the center axle 6 will constitute the drive wheels of the entire vehicle, it being proposed to use any well known mechanism for operating these wheels and connecting up such mechanism to a motor and shaft adapted for the purpose. The axles 6, 7 and 8 are suitably stayed or reinforced by braces 11 which converge to central points relatively to the front and rear axles 7 and 8 and engage the central or intermediate axle 6 without in the least interfering with the functions of these axles. By means of these braces the running gear structure as a whole will be materially strengthened.

The most essential features of the invention consist of front and rear equalizer organizations 12 and 13 between which and the axles 6, 7 and 8 spring units 14, 15, 16 and 17 are mounted, the spring units being duplicated at opposite sides of the running gear. Each equalizer organization comprises opposite side bars 18 connected by a cross-bar 19, which in the equalizer organization 12 is located in advance of the centers of the two side bars 18. A bolster 20 is interposed between the front portion of the frame or chassis 5 and the cross-bar 19, said bolster having a single rest point or movable connection 21 relatively to the cross-bar, said connection being at the center of the latter bar, as clearly shown by Fig. 3. Depending from the opposite ends of the side bars 18 are clips 22 and 23 which form the supports for the intermediate portions of the spring units 16 and 14 respectively, and the rear ends of the spring units 16 and the front ends of the spring units 14 are movably connected to depending links 24 and 25 also movably connected at their upper ends to the side bars 18. The rear equalizer organization 13 is structurally similar in all respects to the front equalizer 12, and between the side bars 26 of the said rear equalizer organization and the frame or chassis 5 a bolster 27 is interposed and is attached at two points, as at 28, to a cross-bar 29 connecting the side bars 26. The cross-bar 29 in the equalizer organization 13 is located in rear of the centers of the side bars 26, and from the foregoing it will be seen that the frame or chassis 5 which supports the body of the vehicle or car is connected at a single point at its forward extremity to the front equalizer organization 12 and at two points at its rear extremity to the rear equalizer organization 13. Depending from the opposite ends of the side bars 26 are clips 30 and 31 which form the supports for the intermediate portions of the spring units 15 and 17 respectively, and the rear ends of the spring units 15 are movably attached to depending links 32 secured at their upper ends to the side bars 26, and the front ends of the spring units 17 are secured to the lower ends of links 33 also depending from the side bars 26. The rear ends of the spring units 14 and the front ends of the spring units 15 are secured to ears or analogous devices 34 carried by the drive axle 6, and the front ends of the spring units 16 and the rear ends of the spring units 17 are respectively movably associated with the front and rear axles 7 and 8. All of the spring units 14, 15, 16 and 17 are free to move vertically or to perform their usual spring functions, the links 24, 25, 32 and 33 yielding to the expansion of the said spring units through the medium of load weight on the chassis 5 and during irregular movement of the running gear in passing over elevations or obstructions in a roadway or through depressions in the latter, the spring units all compensating as to expansion and contraction to these several conditions of travel and thus render the riding movement of the vehicle or car very easy. The easy riding movement of the car is also augmented and very effectively assisted by the equalizer organizations specified and which absorb all shocks or jars due to the wheels 9 suddenly meeting obstructions or traveling through depressions.

The front extremities of the spring units 16 and the rear extremities of the spring units 17 are so associated with their respective axles 7 and 8 that the said axles may rise and fall in conformity with irregularities of the roadway without in the least twisting or distorting the said spring units, and each axle is formed with a curved or semicircular seat 35 on opposite sides of the center so that each axle has two seats of similar form located near the opposite extremities thereof. These seats 35 are formed by pressing or forging the axles 7 and 8 adjacent to the opposite ends thereof in a downward direction, the metal being forced into segmental or radius projections $35^a$ at the lower edges of the said axles. The front extremities of the spring units 16 and the rear extremities of the spring units 17 have clips 36 attached thereto, said clips embodying rear walls 37 and front walls 38 of equal length, semicircular bearing bosses or enlargements 39 being secured to the top plates $36^a$ of the clips between the said walls to loosely fit in the seats 35, the walls 37 and 38 closely embracing the rear and front sides of the axles 7 and 8, as clearly shown by Fig. 5. The bosses or enlargements 39 are secured to the top walls $36^a$ of the clips 36 by bolts $39^a$ which project through and above the said walls $36^a$ and also through flattened ends $39^b$ of the spring units 16 and 17. The rear and front walls 37 and 38 of the clips 36 are also continued downwardly below the axles and their lower ends are formed with openings $38^a$ in which bolts or bolt rods 40 are mounted and have rollers $40^a$ thereon, said rollers bearing against and adapted to ride on the segmental or radius projections $35^a$ when the axles and spring units relatively move. The ends of each pair of bolts or bolt rods 40 are engaged by the bifurcated ends of a rod 41, as shown particularly by Fig. 6, to hold the spring units 16 and 17 relatively to their respective axles 7 and 8 in a harmonious association and to effect a unified operation thereof relatively to the movements of the axles 7 and 8. It will therefore be seen that the spring units in all instances will have but one movement relatively to the several axles, this movement being vertical, and both the spring units 16 and 17 and the axles 7 and 8 are held rigid by the particular association of the extremities of the said units with the axles, and these spring units as well as the units 14 and 15 will be prevented from having the least sidewise movement and the spring units will as a consequence resist injury by sudden shocks or jars that might otherwise be irregularly imposed thereon. Moreover, the front bolster 20 by its single movable connection relatively to the bar 19 is permitted to have a sidewise tipping action until its ends strike the side bars 18 of the front equalizer 12, but said bolster has no other movement, and, moreover, the equalizer organization 12 may move vertically at opposite sides with a resilient action through the medium of the spring units connected thereto and the two side bars 18 may have a rocking movement in view of the fact that they are mounted or connected in such manner relatively to the cross-bar 19 as to permit such movement in accordance with the elevation and depression of the front axle 7 and its wheels 9. The rear axle 8 has its movements taken up and absorbed through the rear equalizer organization 13, but the rear bolster 27 cannot move or tip sidewise on the bar 29 owing to the two points of attachment 28 of the said bolster. The side bars 26 of the rear equalizer organization 13 may rock on the ends of the bar 29 or move vertically, but not sidewise. It will therefore be seen that either of the front wheels running over uneven roadways disturbs the body of the vehicle or car very little because the front end of the load sets on a center which receives shocks and vibrations through spring units and equalizing means, and the shocks or vibrations that may come through the wheels 9 of the intermediate driving axle 6 are likewise taken up by the spring units and equalizers, and the irregular movements of the four front wheels are disturbed and absorbed with the result that the front end of the vehicle or car has only a vertical motion. Moreover, the forward four wheels are in full control of the vehicle or car for tipping motion at all times, for the reason that the load is to a greater extent disposed rearwardly through the medium of the two points of rest provided by the bolster 27 in its two points of attachment to the bar 29, and the greater part of the load is thereby carried by the rear axle 8 and the wheels 9 of the latter. Moreover, the load in accordance with the improved structure hereinbefore described always has a good foundation or base because none of the wheels ever leaves its position in relation to the base or foundation of the load. The load is also brought close to the ground and through the arrangement of springs and equalizers hereinbefore described can be distributed uniformly on each wheel, though it is preferred that a little more weight be arranged on the center wheels for insuring effective driving of the machine through these wheels.

What is claimed is:

1. In running gear for vehicles, the combination of front and rear and intermediate axles having wheels thereon, the wheels of the front and rear axles being mounted for steering purposes and the intermediate axle constituting the driving means of the running gear, and spring units and equalizers interposed between the intermediate axle and the front and rear axles, the equalizers being independent organizations and respectively connected to the spring units between the intermediate and front and rear wheels.

2. In running gear for vehicles, the combination of front and rear axles both carrying steering wheels, an intermediate driving axle having wheels thereon, front and rear equalizer organizations, spring units between the opposite extremities of the equalizer organizations and the front and rear and intermediate axles, and a frame for supporting the body having one point of connection with the front equalizer organization and two points of connection with the rear equalizer organization.

3. In running gear for vehicles, the combination of front and rear and intermediate axles, the intermediate axle operating as the driving means for the running gear and the front and rear axles carrying steering wheels, and a frame for supporting the body having a single point of attachment at its front extremity relatively to the running gear and two points of attachment at its rear extremity relatively to the said gear.

4. The combination with running gear for vehicles including axles and spring units, of a frame for supporting a body having a single point of rest at its front extremity relatively to a portion of the running gear and two points of rest at its rear extremity relatively to said gear and wholly clear of the axles and spring units.

5. In running gear for vehicles, front and rear axles carrying steering wheels and an intermediate driving axle carrying wheels, spring units having terminals associated with all of the axles, and equalizer organizations having side bars with means at their ends for supporting the spring units and also provided with other means to which the adjacent ends of the spring units are attached.

6. In running gear for vehicles, front, rear and intermediate axles carrying wheels, spring units having terminals with which the front and rear axles movably engage, equalizer organizations in advance and in rear of the intermediate axle and to which the opposite terminals of the said spring units are connected, and other spring units connected to the intermediate axle and also to adjacent portions of the equalizer organizations.

7. In running gear for vehicles, front and rear axles carrying steering wheels and an intermediate drive axle also carrying wheels, front and rear equalizer organizations having cross-bars respectively in advance and in rear of the centers of the said organizations, spring units interposed between the equalizer organizations and the axles, bolsters mounted on the cross-bars of the equalizer organizations, the front bolster having a single point of attachment to its cross-bar and the rear bolster having two points of attachment to its cross-bar, and a frame for supporting a body mounted on the said bolsters.

8. In running gear for vehicles, the combination of front and rear axles having steering wheels and an intermediate driving axle having wheels thereon, front and rear equalizer organizations, spring units introduced between the front side portions of the front equalizer organization and the rear extremities of the side portions of the rear equalizer organization and the front and rear axles respectively, the latter axles having curved seats and the extremities of the spring units engaging the same provided with curved bosses to engage the said seats, and depending hangers connected by rods for unifying the terminals of the said spring units, spring units between the intermediate axle and the adjacent extremities of the side portions of the equalizer organizations, and a frame for supporting a body mounted on the equalizer organizations.

In testimony whereof I have hereunto set my hand in presence of two subscribing witnesses.

WILLIAM CORCORAN.

Witnesses:
  W. J. JEFFERIES,
  TOM F. COWING.